June 10, 1947.   J. MIHALYI   2,422,033
ORTHO-PSEUDO STEREO RANGE FINDER
Filed Oct. 3, 1945   4 Sheets-Sheet 1
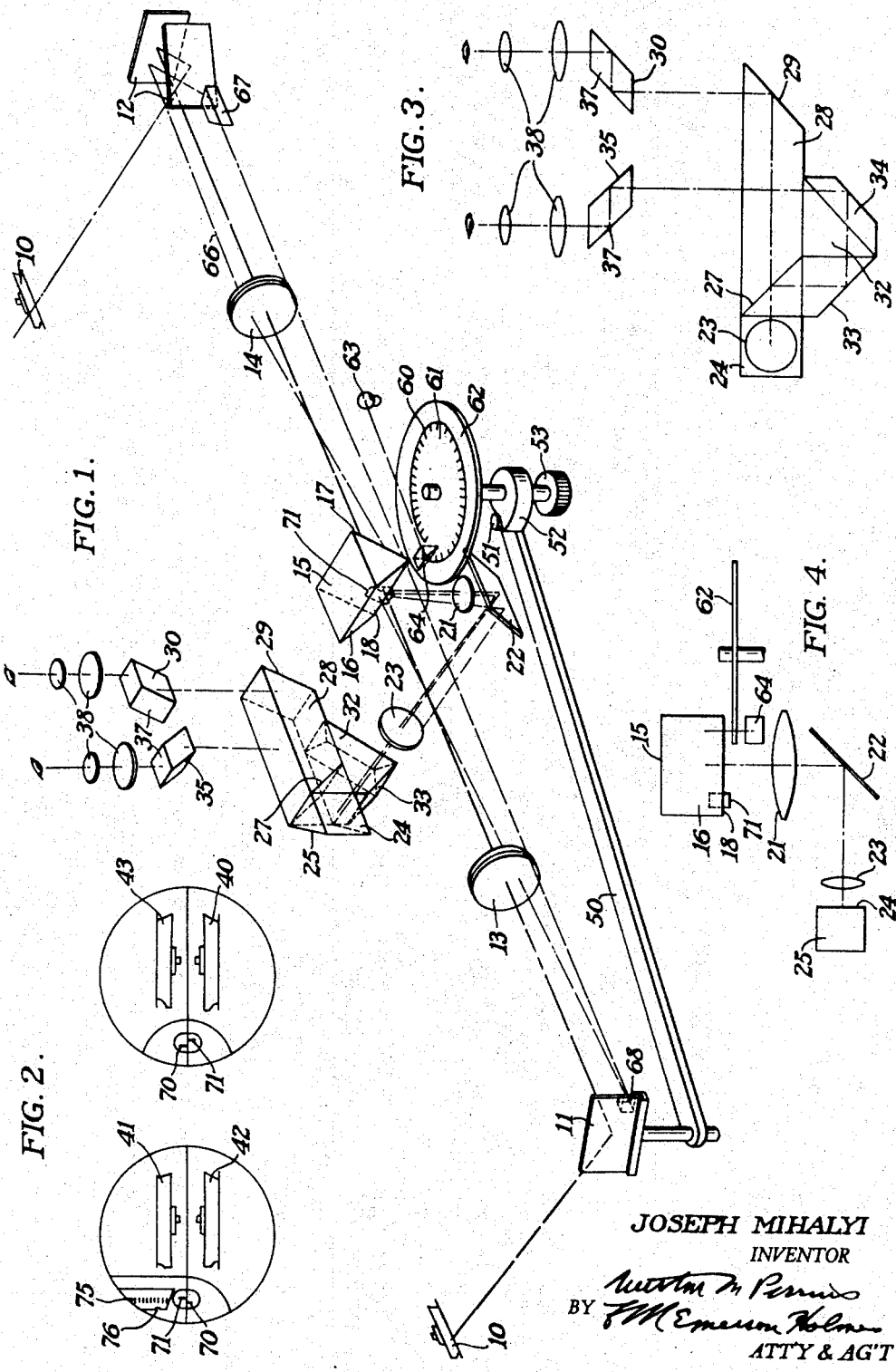
JOSEPH MIHALYI
INVENTOR
BY
ATTY & AG'T June 10, 1947.                J. MIHALYI                2,422,033
                  ORTHO-PSEUDO STEREO RANGE FINDER
                     Filed Oct. 3, 1945         4 Sheets—Sheet 2

JOSEPH MIHALYI
INVENTOR
ATTY & AG'T

June 10, 1947.  J. MIHALYI  2,422,033
ORTHO-PSEUDO STEREO RANGE FINDER
Filed Oct. 3, 1945  4 Sheets-Sheet 4

JOSEPH MIHALYI
INVENTOR
BY
ATT'Y & AG'T

Patented June 10, 1947

2,422,033

UNITED STATES PATENT OFFICE 2,422,033

ORTHOPSEUDO STEREO RANGE FINDER

Joseph Mihalyi, Rochester, N. Y., assignor to Eastman Kodak Company, Rochester, N. Y., a corporation of New Jersey Application October 3, 1945, Serial No. 620,153

12 Claims. (Cl. 88—2.7)

The present invention relates to ortho-pseudo stereo range finders, but certain features thereof have general application to coincidence range finders.

Double viewing point range finders may be roughly divided into three groups, coincidence type, stereo type, and a cross between the two known as ortho-pseudo stereo range finders such as those described in three of the other cases of this series, Serial No. 479,101, now Patent 2,401,710, Mihalyi and MacNeille, filed March 13, 1943, Serial No. 526,020, now Patent 2,403,732, MacNeille, filed March 11, 1944, and Serial No. 603,496, MacNeille, filed July 6, 1945.

The primary object of the present invention is to provide a range finder of simple accurate design. These advantages are gained from the particular beam combining means used which provides juxtaposed images.

It is a particular object of the invention to provide an ortho-pseudo stereo range finder, one embodiment of which has an invert field in which the dividing line is horizontal relative to the target being ranged. The advantages of this form of range finder lie mainly in the matching of coincidence in depth and the resultant accuracy obtained thereby. Furthermore the range finder designed according to the invention is particularly suitable for a relatively short base instrument such as might be intended for hand held operation. And on the other hand, one embodiment of the invention constitutes an excellent long base instrument useful in height finding.

It is an object of one embodiment of the invention to provide means for incorporating auto-collimation or range correction setting systems such as described in detail in the earlier cases of this series which are listed for example in Serial No. 472,831, now Patent 2,401,700, Mihalyi, filed January 19, 1943.

The present invention can be most clearly described with respect to some fixed orientation of the range finder in space although the instrument in actual use is of course free to turn any way. Therefore throughout this specification and claims, everything is described with respect to the direction in which light beams from the target being ranged arrive at the viewing points of the instrument. This direction is said to be "horizontal" and the viewing points of the range finder (the ends of the base) are said to be "horizontally" spaced. Obviously any range finder may be tipped in any direction and may be used to range on a target above or below the observer so that the actual orientation in space of the incoming rays may be quite different from the true horizontal relative to the earth. Having thus defined "horizontal" as the plane containing the viewing points of the range finder and the beams from the target, other terms are all used relative thereto including such terms as vertical, upper, lower, front, and back. Also the horizontal plane as thus defined divides the target itself in a horizontal line. In any image of the target formed within the instrument this horizontal line may or may not be tilted, but the orientation of instrument parts with respect to such an image line (which was horizontal in the target itself) can be positively defined.

With terms thus defined, it is pointed out that the present invention is applicable to range finders of the type having horizontally spaced viewing points at which to receive light beams horizontally from a target being ranged and having means for directing the two beams toward each other. In certain embodiments the beams may follow circuitous paths but they end up going at least approximately directly toward one another. Lens means are included in each beam for forming target images in a coincidence plane common to the two beams with the images together and in general "vertical." However, the useful parts of the images do not actually reach this common coincidence plane (although they reach it virtually) since mirrors are included to reflect a portion of each beam to one side just before they reach coincidence. These mirrors are in the form of an external dihedral reflector with its roof edge in the common coincidence plane bisecting each image and with its reflecting surfaces reflecting one-half of each image to a single plane so that the images are juxtaposed and divided by the roof edge. The roof edge is parallel to a direction or line in the image corresponding to a horizontal line in the target itself. In the usual and simplest form of the instrument in which the beams are travelling directly toward each other as they approach the common coincidence plane, the dihedral reflector has a dihedral angle of 90°, but this dihedral angle can be varied to take care of beams approaching each other at an angle and still to give coplanar juxtaposed images. The juxtaposed images can be viewed directly and adjusted for coincidence, but the greatest benefit of this arrangement is obtained in ortho-pseudo stereo ranging. Therefore the preferable embodiment of the invention has binocular viewing means arranged with the pair of images in one eyepiece image plane reversed relative to those in the other eyepiece image plane.

The preferred embodiments of the invention have the juxtaposed images inverted relative to one another, which feature is obtained by having an odd number of reflectors in the directing means from one viewing point and an even number of reflectors in the directing means from the other viewing point.

Thus the preferred embodiment of the invention includes the means for directing the target beams toward each other with an odd number of reflectors on one side and an even number on the other, the lens means for forming the target images in the common coincidence plane and the dihedral reflector bisecting the images with its roof edge parallel to a line in the image which corresponds to a horizontal line in the target. The binocular viewing means relays the juxtaposed images to each eye with the images in the left eyepiece image plane inverted relative to those in the right eyepiece image plane. It is noted that while the dihedral angle is somewhat critical, rotation of the dihedral reflector about the roof edge merely tips as a whole the plane of the coplanar images. The binocular viewing system can be swung around to take care of this tipping or contrariwise, as is the custom in practice, the dihedral reflector can be adjusted to send the light into the viewing system.

In certain embodiments of the invention in order to provide range correction setting, i. e. collimation control, it is preferable to have means for introducing a collimation control beam to one side of the dihydral reflector whereat it is reflected outward toward one of the viewing points, thence outside of the range finder optical system and over to the other viewing point where it is in turn reflected back to the range finder system along with the target beam, eventually to reach the image plane to be visible to the observer while ranging.

Other objects and advantages of the invention and the various forms thereof will be understood from the following description when read in connection with the accompanying drawing, in which:

Fig. 1 shows in perspective the optical system of a range finder according to the present invention.

Fig. 2 shows the binocular field of view in such a range finder.

Fig. 3 is a front elevation of the beam splitting and inverting assembly of the range finder shown in Fig. 1.

Fig. 4 is a vertical section of the part of the instrument whereat the collimation control beam is introduced.

Figure 5:
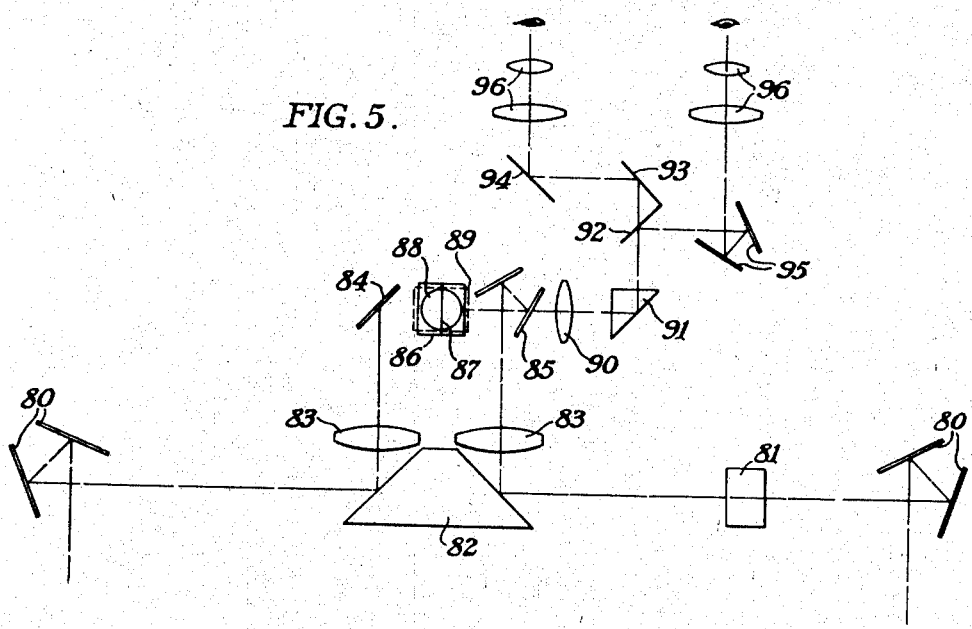
Fig. 5 is a plan view of the optical system of an embodiment of the invention particularly adapted to long base range finders such as height finders.

In Fig. 1 light from a target represented by two small tanks 10 is received at spaced viewing points and is reflected from the left viewing point by a single front surface mirror 11 and from the right viewing point by penta reflectors 12. Objectives 13 and 14 respectively bring these beams to focus near the center of the range finder base. Due to a prism 15 whose surfaces 16 and 17 act as an external dihedral reflector these images actually lie in a horizontal plane, juxtaposed, with the roof edge 18 of the prism acting as the sharp dividing line. That is, the upper half of each of the images are so reflected since the roof edge 18 lies approximately on the optic axis of the objectives 13 and 14 and approximately bisects each image. The surfaces 16 and 17 are preferably metallic coated for increased reflectance. In Fig. 1 the arrangement of elements from the prism 15 down to a mirror 22 is shown slightly exploded for clarity, Fig. 4 being somewhat more accurate in this respect. A field lens 21 is positioned near the roof edge 18 for optical efficiency. The two beams are then reflected by the mirror 22 to a relaying assembly including an objective 23 which is shown spaced in front of the rays of the prism assembly but which in practice may be cemented to the entrance face 24 thereof. On entering the prism assembly through the face 24 the beams are reflected by a surface 25 to an achromatic (or less preferably dichroic) beam splitter 27. The portion of both beams which is transmitted by the beam splitter 27 enters a long prism 28 and is reflected by the end surface 29 thereof to the right eye image plane 30. The portion of both beams which is reflected by the beam splitter 27 enters a prism 32 to be reflected once at a surface 33 thereof and twice at a roof surface 34. These details are best shown in Fig. 3. After the second reflection this beam passes through the parallel sides of the long prism 28 into focus at the left eye image plane 35. Rhombs 37 are provided to permit adjustment for observers with different interocular separations and eyepieces 38 permit binocular viewing of the images in the planes 30 and 35.

As shown in Fig. 2 the right viewing point image formed by the objective 14 appears erect at the point 40 in the right eyepiece and appears inverted at 41 in the left eyepiece. Similarly the image formed by the objective 13 as relayed by the objective 23 to strike the image plane 35 appears erect at 42, but that portion thereof which strikes the image plane 30 appears inverted at 43. For ranging, the reflector 11 is rotated by a long arm 50, a cam follower 51 and a cam 52 which may be adjusted by means of a knob 53. As the reflector 11 rotates, the images 42 and 43 both appear to move in the same direction, for example the tank shown may appear to move forward. Since this brings the images 42 and 40 closer together these images stereoscopically fused by the eyes of the observer form a single image in space which appears to move toward the observer. At the same time the image 43 moves farther from the image 41 and the stereoscopic image formed by these two images appears to move away from the observer. This gives the well known ortho-pseudo stereo effect by which critically accurate judgment may be made as to when the images appear to be at the same distance.

To provide collimation control a spiral 60 and scale 61 on a disc 62 are mounted to rotate with the cam 52. Light from a lamp 63 reflected by a small prism 64 best shown in Fig. 4, illuminates a portion of the spiral 60 and scale 61 substantially in the primary image plane. This light is reflected by the surface 17 of the dihedral reflector and since it is coming from the image plane, this light is collimated by the objective 14. The collimation control beam shown by dotted lines 66 strikes one of the penta reflectors 12 whereat it is reflected to and through a transparent spot in the other reflector 12 to reach a dove prism 67. This prism 67 is cemented to the penta reflector and reflects the collimation control beam past the rest of the optical system all the way to the other viewing point whereat it strikes a cut-away spot 68 on the mirror 11 which spot is oriented to reflect the beam 66 back to and through the objective 13 which brings it to focus in the image plane forming a small line image 70. When the instrument is properly collimated this line 70 is in coincidence with a mark 71 engraved on a small plate adjacent to the roof edge 18 and just below the reflector 17. This mark 71 is illuminated by the light coming through the objective 14. The mark 71 and the image 70 formed in coincidence below the mirrors 17 and 16 respectively are relayed by the objective 23 to appear in both eyepiece image planes 30 and 35 as shown in Fig. 2. When the lines are not in coincidence, the instrument is known to be out of adjustment which may be corrected by turning one of the reflectors 12, shifting one of the objectives 13 or 14 or by some secondary adjustment on the mirror 11. Various forms of such adjustments are described in other cases of this series referred to above. When the instrument is in adjustment as indicated by coincidence of the images 70 and 71, the range may be read directly in the left eyepiece by the image 75 of the scale 61. The index 76 for this image 75 is formed in the image plane 35.

Figure 6:
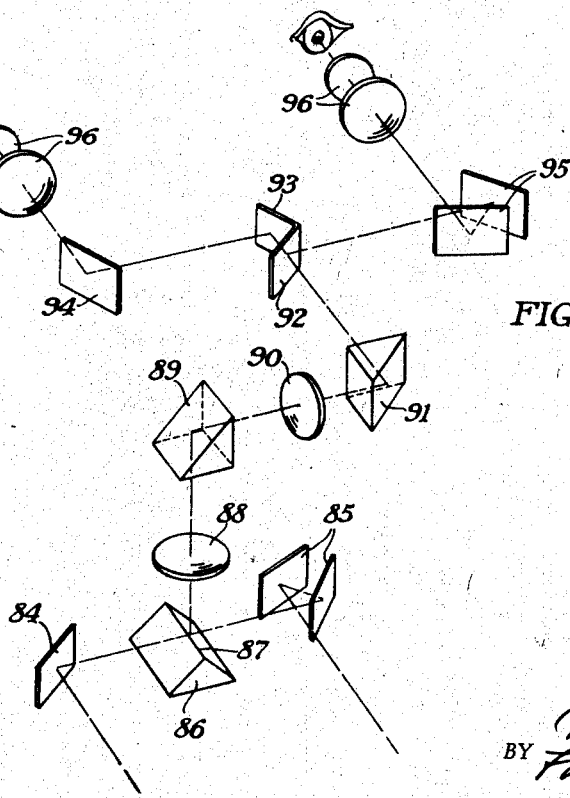
Fig. 6 is a perspective view of the viewing system shown in Fig. 5.

In Fig. 5 light reflected by viewing point penta reflectors 80 reaches a centrally located prism 82, one of the beams having passed through a light deviating device 81. The prism 82 may be replaced by two single front surface mirrors but the prism form shown is preferable for the sake of rigidity. The two beams are reflected parallel to each other and are brought to focus by lenses 83. In accordance with the invention the two beams are directed toward each other by a single mirror 84 and a penta reflector 85 so that the images are superimposed in a common coincidence plane. The one extra reflection (and lateral inversion) in one beam is necessary to give this superposition. An external dihedral reflector 86 is located with its roof edge 87 in this common coincidence plane and horizontal. The half images as reflected by the dihedral reflector are juxtaposed, bisected by the roof edge and inverted relative to one another. The viewing system includes a field lens 88 near the juxtaposed images, a pair of reflectors 89 and 91 for rotating the image, a relay lens 90 and binocular viewing means. The light is split by a semi-reflector 92, the transmitted beam suffering two reflections at mirrors 93 and 94 before going to the right eye image plane and the reflected beam suffering three reflections, one at the beam splitter 92 and two at the penta reflector 95 before going to the left eye image plane. Binocular eyepieces 96 are provided for viewing the images. The only disadvantage to the system shown in Figs. 5 and 6 is the long drawn out arrangement of the optical system following the lenses 83 and the resultant instability. This may be corrected by folding the whole optical system around itself as shown in Fig. 7 to bring the dihedral reflector adjacent to the large central prism for rigidity.

Figure 7:
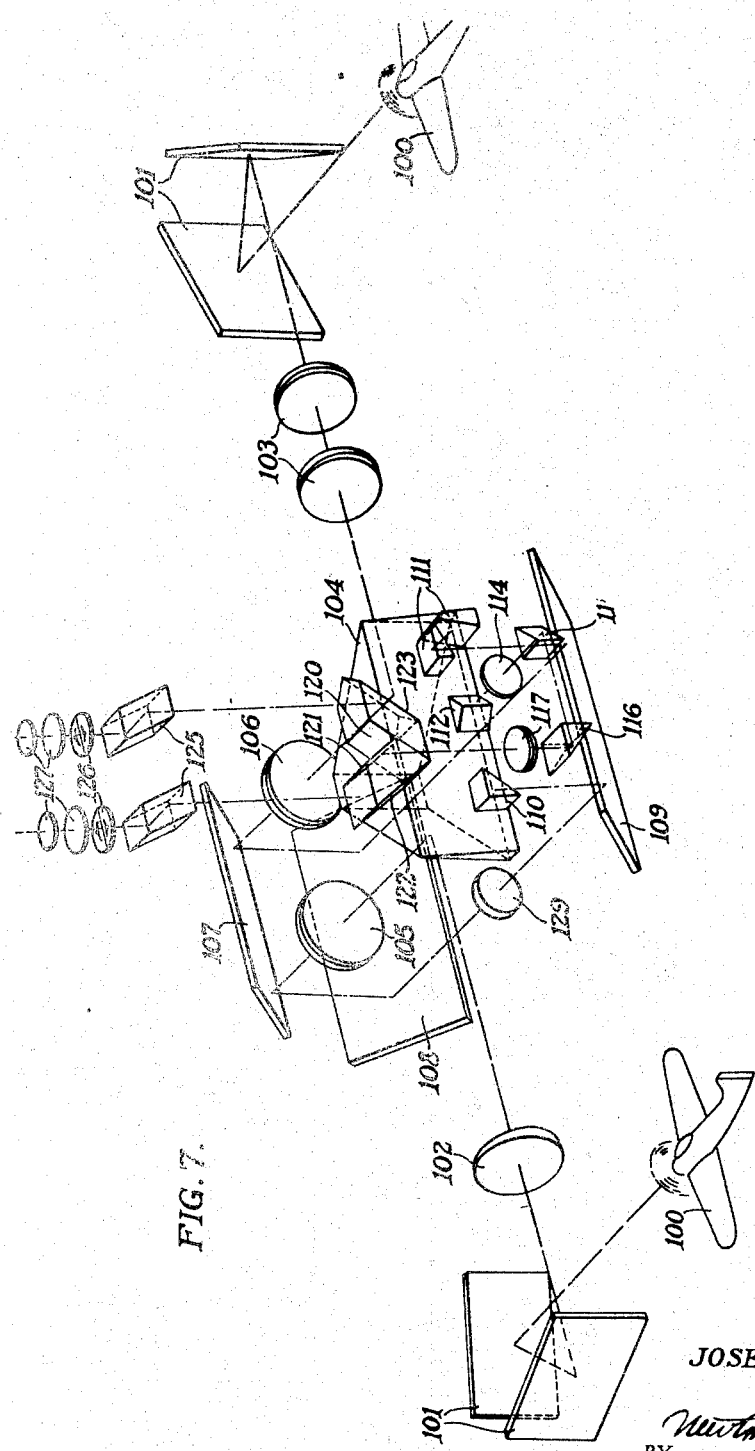
Fig. 7 is a perspective view of a slightly different embodiment of the invention.

In Fig. 7 light is received from a target represented by small airplanes 100 at spaced viewing points. Penta reflectors 101 reflect these beams toward each other, one of the beams going through light deviating ranging wedges 103 and the other passing through a simple wedge 102 adjustable for collimation or range correction setting. The two beams are reflected laterally by front surface reflections at a flat prism shaped unit 104. They are then focused by objectives 105 and 106 (corresponding to the objectives 83 of Fig. 5). The beams are then reflected together, a feature whose importance will be explained in a moment, by mirrors 107, 108, and 109. The right viewing point beam is then reflected by front surface reflection at a prism 110 and the left viewing point beam is reflected by a penta reflector 111. The two beams then pass toward each other, images being formed at a common coincidence plane in which is located the roof edge of an external dihedral reflector 112 all as described before. It will be noted that the roof edge is actually vertical in space but it is horizontal relative to the target images because of the wrap-around arrangement of the beams. The roof edge is parallel to the direction in which the beams are travelling when they strike the reflectors 110 and 111.

Once the beams are combined and the juxtaposed images formed, the rest of the optical system is not critical since the shift of any part thereof equally affects both beams. The beams are rendered parallel by a single prism unit 104, the two lenses 105 and 106 are quite close by and may be rigidly attached to the unit 104 and furthermore the mirrors 110, 111, and 112 can all be cemented to the prism. The light path between the lenses 105 and 106 and the mirrors 110 and 111 is such that anything which happens to one beam also happens to the other. Tipping of one of the mirrors 107, 108, or 109 simultaneously and equally affects both beams. Thus at least one source of error is eliminated in this form of instrument.

A field lens 114 is located near the juxtaposed images and light from the images is reflected by prisms 115 and 116 upward through a relay lens 117. The beam is split by a beam splitter 120 so that the transmitted portion is reflected by internal reflection at surfaces 121 and 122 of a prism. The reflected portion is inverted by a roof prism 123. The two beams transmitted by rhombs 125 whose purpose is to permit adjustment for different observer interocular separations come to focus in the image planes 126 of eyepieces 127. Halving correction in the usual way may be provided by disc 129.

Figure 8:
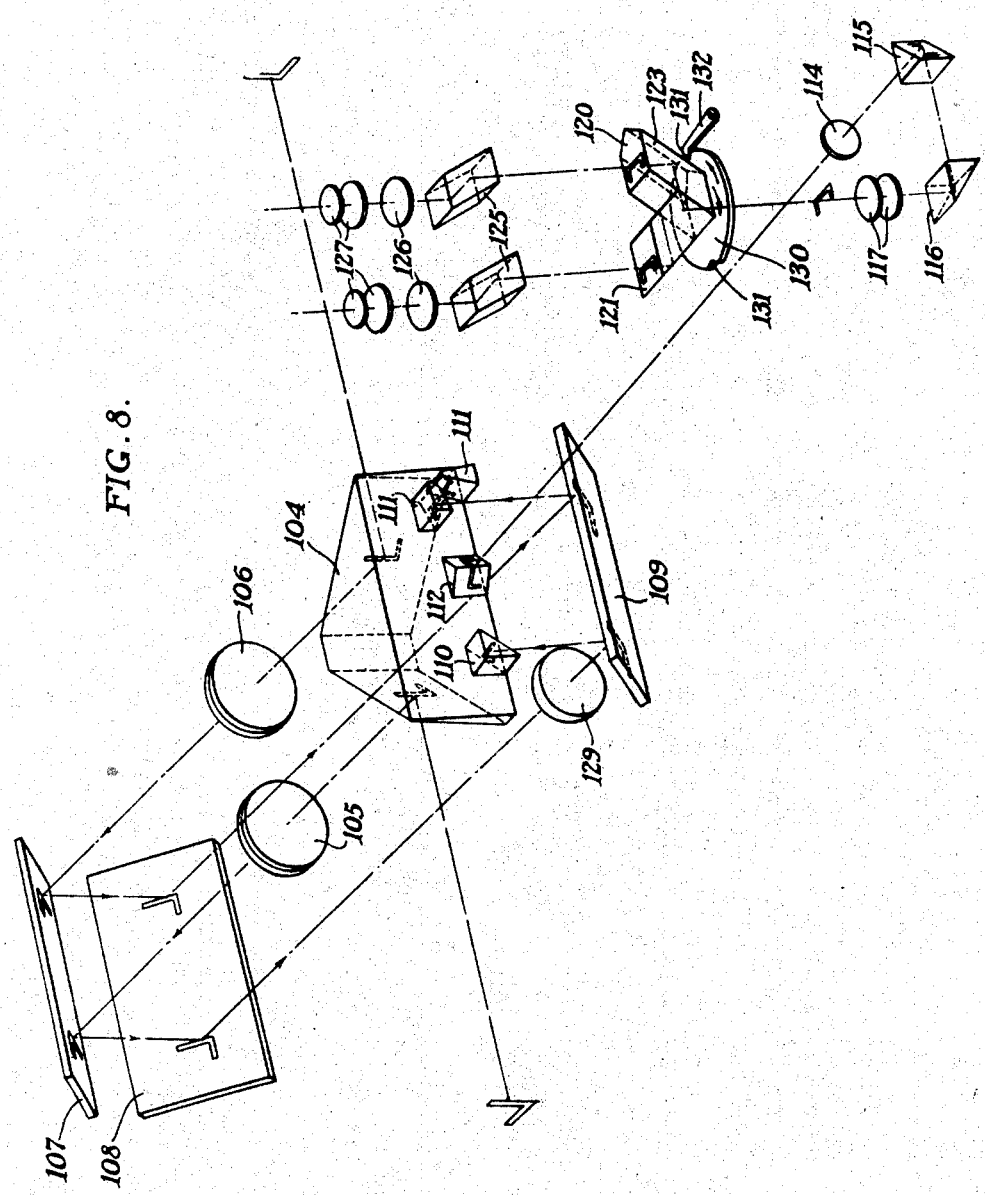
Fig. 8 is an exploded view of the central unit assembly of Fig. 7.

Fig. 8 is merely an exploded view of the central prism assembly of Fig. 7. The letter L is used to represent the orientation of the light beams and all of the elements are separated horizontally for clarity.

If one wished to change over from ortho- to pseudo-ortho, i. e. if one wished to have the ortho images appear in the upper half of the field in one case and in the lower half of the field in the next it is merely necessary to rotate the prism assembly 120—1—2—3 about the optic axis of the light beam coming up from the relay lens 117. An arrangement for doing this is shown in Fig. 8, but not in Fig. 7 since it would confuse the latter drawing. It consists of a transparent disc support 130 which carries both the prism 120 and the prism 121. This disc 130 is rotatable in its own horizontal plane between two alternative positions, 180° to one another. The correctness of the positions is automatically insured by notches 131 and detent 132. The roof prism 123 is smaller than the simple rhomb having surfaces 121 and 122 to allow for the difference in path length in glass.

Having thus described the preferred embodiment of my invention I wish to point out that it is not limited to this structure but is of the scope of the appended claims.

I claim:

1. A range finder of the type having spaced viewing points in horizontal alignment at which to receive light beams horizontally from a target being ranged, comprising effectively horizontally reflecting means for directing the two beams from the viewing points toward each other, lens means in each beam for forming a target image optically at a vertical coincidence plane common to the two beams with the images together, an external dihedral reflector with its roof edge in said plane bisecting each image and parallel to a line in each image corresponding to a horizontal line in the target and with its reflecting surface reflecting one-half of each image to a single plane, the images being juxtaposed, inverted relative to one another and divided by the roof edge, and means for viewing the juxtaposed image halves.

2. A range finder according to claim 1 in which the directing means for light from one viewing point includes an odd number of effectively horizontally reflecting reflectors and the directing means for the other viewing point includes an even number of effectively horizontally reflecting reflectors whereby there is no lateral inversion of one of the juxtaposed images relative to the other.

3. A range finder according to claim 1 in which the viewing mans includes a beam splitter for dividing the beam from the juxtaposed images into two portions, right and left eyepieces, and means for directing the portions respectively to the right and left eyepieces, the directing means for one eyepiece including an odd number of reflectors and the directing means for the other eyepiece including an even number of reflectors whereby the right eye image is inverted relative to the left eye image giving ortho-pseudo effects.

4. An ortho-pseudo stereo range finder of the type having spaced viewing points in horizontal alignment at which to receive light horizontally from a target being ranged, comprising means including an odd number of effectively horizontally reflecting reflectors in one beam and an even number of effectively horizontally reflecting reflectors in the other beam for directing the two beams from the viewing points toward each other, lens means in each beam for forming a target image optically in a vertical coincidence plane common to both beams with the images together, an external dihedral reflector with its roof edge in said plane bisecting each image and parallel to a line in each image corresponding to a horizontal line in the target and with its reflecting surfaces reflecting one-half of each image into a single plane with the images juxtaposed, inverted relative to one another and divided by the roof edge, a beam splitter positioned to receive light from the dihedral reflector and to divide it into two portions, a right and a left eyepiece and means for directing said portions respectively to the eyepieces including an odd number of reflectors for one portion and an even number of reflectors for the other portion.

5. A range finder according to claim 4 in which the eyepieces are of short focal length and in which lens means are included for relaying the juxtaposed images from the plane of said roof edge to the eyepiece image planes.

6. An ortho-pseudo range finder of the type having spaced viewing points in horizontal alignment at which to receive light beams horizontally from a target being ranged comprising a single horizontally reflecting reflector at one viewing point and a horizontally reflecting penta reflector at the other viewing point for directing the two beams horizontally toward each other, an objective in each beam for forming a target image in a vertical coincidence plane optically halfway between the objectives with the images together and approximately superimposed, an external dihedral reflector with its roof edge horizontal in said coincidence plane and bisecting each image and with its reflecting surfaces reflecting half of each image to a single approximately horizontal plane, the images being juxtaposed and inverted relative to one another, a beam splitter for receiving light reflected by the dihedral reflector and for dividing it into two portions, a right and a left eyepiece, means for directing the two portions respectively to the eyepieces with an odd number of reflectors in the portion going to one eyepiece and an even number of reflectors in the portion going to the other eyepiece, and means for relaying the juxtaposed images to the eyepiece image planes.

7. A range finder according to claim 6 including a field lens near the juxtaposed images.

8. A range finder according to claim 6 in which the optical system between the juxtaposed images and the eyepieces including the beam splitter and relay system is arranged to erect one of the images in each image plane.

9. A range finder according to claim 6 including means for introducing a collimation control beam to strike one side of the dihedral reflector whereat it is reflected to one viewing point and including means at said viewing point for reflecting it to the other viewing point which in turn includes means for reflecting the beam along with the target beam from the latter viewing point to at least one of the eyepieces.

10. A range finder according to claim 6 in which the relaying means includes a prism with opposite ends at right angles to one another, the beam splitter being mounted on one of said ends, a prism attached to said beam splitter with an entrance face for receiving the two viewing point beams and an exit face for transmitting the portion of the two beams which is reflected by the beam splitter, the transmitted portion going to and being reflected at the other end of the long prism and a prism having a plane reflecting surface and a roof reflecting surface for receiving the reflected portion of the split beams and for reflecting it back through the long prism.

11. An ortho-pseudo stereo range finder having spaced viewing points in horizontal alignment at which to receive light beams horizontally from a target being ranged, an optical square at each viewing point for directing the two beams horizontally toward each other, the light in the beams being substantially collimated because of the relatively great distance of the target, two reflecting surfaces rigidly attached to one another for receiving the two beams respectively and for reflecting them horizontal parallel to each other and to one side, an objective in each beam for converging the beam and forming target images, a single reflector in one converging beam and a penta reflector in the other converging beam for directing them toward each other with the images approximately superimposed in a common vertical coincidence plane, an external dihedral reflector with its roof edge in said coincidence plane parallel to a line in each image corresponding to a horizontal line in the target and with its reflecting surfaces reflecting the images to a single plane in juxtaposed relation and inverted relative to one another, a beam splitter for receiving light reflected by the dihedral reflector and for dividing it into two portions, a right and a left eyepiece, means for directing the portions respectively to the two eyepieces with the images inverted in one eyepiece relative to those in the other.

12. A range finder according to claim 11 including a plurality of reflectors in the converging beams between the objectives and said single and penta reflectors, for reflecting both beams around to the single and penta reflectors which are located near the two reflecting surfaces in the collimated beams, said single and penta reflectors being rigidly attached to the two reflectors and each reflector of said plurality of reflectors reflecting both of the converging beams to deflect them equally.

JOSEPH MIHALYI.